United States Patent Office 2,836,602
Patented May 27, 1958

2,836,602
PROCESS FOR THE PRODUCTION OF 2-AMINO-5-IMINO-PYRROLENINES

Georg Rösch, Leverkusen, Helmut Klappert, Koln-Stammheim, and Walther Wolf, Leverkusen, Germany, assignors to Farbenfabriken Bayer Aktiengesellschaft, Leverkusen, Germany, a corporation of Germany No Drawing. Application January 6, 1955
Serial No. 480,298
Claims priority, application Germany January 7, 1954
5 Claims. (Cl. 260—313)

This invention relates to a process for the production of tetra-aza-porphin intermediates, in particular to pyrrolenines.

It is an object of the present invention to provide a process for the production of 2-amino-5-imino-pyrrolenines. A further object is to provide intermediates for the preparation of tetra-aza-porphins. Other objects will appear hereinafter.

In accordance with the present invention 2-amino-5-imino-pyrrolenines are obtained by reacting maleic or fumaric dinitriles and mixtures thereof of the general formula $$\begin{array}{c}R-C-CN\\\parallel\\R'-C-CN\\R-C-CN\\\parallel\\NC-C-R'\end{array}$$

wherein R stands for hydrogen, alkyl, cycloalkyl, aralkyl, phenyl or halogen, R' stands for alkyl, cycloalkyl, aralkyl or halogen, and R+R' may be ring members of a cycloalkylene ring in the case of the maleic dinitriles, with alcohol and dry hydrogen halide in an inert diluent and treating the imino ether formed with ammonia or substances giving off ammonia under the reaction conditions.

It is believed that 2-amino-5-imino-pyrrolenines thus obtained may be represented by the following tautomeric formulae

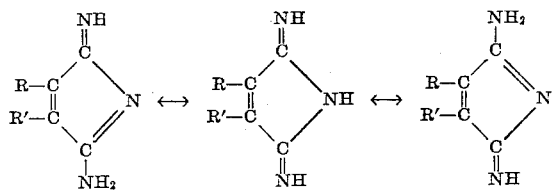

Among the dinitriles which may be used for the process of the invention are for example dimethyl maleic dinitrile, methyl ethyl maleic dinitrile, methyl cyclohexyl maleic dinitrile, methyl benzyl maleic dinitrile, methyl isopropyl maleic dinitrile, cyclohexene dicarboxylic-1,2-dinitrile, benzyl cyclohexyl maleic dinitrile, chloromaleic dinitrile and dichloromaleic dinitrile. Instead of the maleic dinitriles, the corresponding fumaric dinitriles or mixtures of the maleic and fumaric dinitriles can be used.

Suitable organic diluents are for example benzene, gasoline, toluene, chlorobenzene, nitrobenzene, chloroform etc.

The reaction is preferably carried out at temperatures within the range of about 0 to 20° C., although higher and lower temperatures may be used, if desired.

In practising the process of the invention, the dinitrile is dissolved in the organic diluent and absolute alcohol is added. In a preferred embodiment of the invention, 1 mol of alcohol is used per 1 mol of the dinitrile. Then dry gaseous hydrogen halide is passed into the reaction mixture while stirring. The imino ether hydrogen halide formed may be recovered, for example, by filtering it from the diluent or by distilling off the latter.

To convert the imino ether hydrogen halide into the pyrrolenine, it is dissolved in alcoholic ammonia, and subsequently gaseous ammonia is introduced into the mixture. Instead of the alcoholic ammonia solution, suspensions of ammonium salts of weak acids may be used, for example a dispersion of ammonium carbonate in methanol. The pyrrolenine salt thus obtained may be recovered by distilling off the organic diluent in vacuo.

The free pyrrolenines can be obtained from their salts by a treatment with alkali hydroxide solution. They are colorless bases which—like their salts—melt under decomposition.

The 2-amino-5-imino-pyrrolenines formed by the process of the invention have similar properties as the amino-imino-isoindolenines which are used as intermediates for the production of phthalocyanine dyestuffs on the fiber. Thus they can be used inter alia as intermediates for the synthesis of tetra-aza-porphin dyestuffs on various substrata. They have a special tendency to form complex compounds with heavy metal compounds.

The invention is further illustrated by the following examples without being restricted thereto; the parts given are by weight if not otherwise stated.

Example 1

106 parts (=1 mol) of dimethyl maleic dinitrile are dissolved in 500 volume parts of dry benzene. Then 92 parts (=1 mol) of absolute ethanol are added and hydrogen chloride is introduced—at first at a high speed and upon saturation of the mixture at a low speed—into the reaction mixture at a temperature within the range of about 0 to 20° C. while stirring. After 48 hours the imino ether hydrochloride formed as an oil is separated from the benzene layer. It crystallizes after some time. The crystals are filtered off with suction, washed with benzene and dried in vacuo.

A solution of methanolic ammonia is prepared by introducing 64 parts of dry gaseous ammonia into 600 parts by volume of methanol. To this solution the above obtained imino ether hydrochloride is added in portions while stirring at a temperature of 0° C. Stirring is continued for about 1 hour while further amounts of gaseous ammonia are introduced. Then the methanol is evaporated in vacuo and the residue mixed with 400 parts by volume of saturated sodium chloride solution. Thereby the ammonium chloride is dissolved while the 3,4-dimethyl-2-amino-5-imino-pyrrolenine hydrochloride is obtained in fine yellow needles. It is sucked off, washed with a small amount of saturated sodium chloride solution and dried in vacuo or in the air.

A further small amount of 3,4-dimethyl-2-amino-5-imino-pyrrolenine can be obtained as poorly soluble nitrate in yellow needles by adding ammonium nitrate to the above filtrate of the hydrochloride.

The free pyrrolenine is obtained from the salts by suspending them in 300 volume parts of saturated sodium chloride solution and adding thereto dropwise about 32 volume parts of a 43% sodium hydroxide solution at a temperature of 0° C. until the reaction mixture becomes alkaline. During this procedure the suspended yellow particles dissolve. After a short time colorless needles precipitate which are sucked off, washed with a small amount of sodium chloride solution and dried in the air or in vacuo. The free base and the hydrochloride decompose when heated to about 100° C. ammonia being split off.

Instead of 106 parts of dimethyl maleic dinitrile, the same amount of dimethyl fumaric dinitrile or a mixture of both dinitriles may be used. If dimethyl fumaric dinitrile is used the imino ether hydrochloride is obtained at once in crystals. In the preparation of the imino ether hydrochloride, the ethanol may be substituted by other alcohols as for example methanol, propanol, butanol or by mercaptanes.

Example 2

By using 120 parts of methyl ethyl maleic or fumaric dinitrile instead of the 106 parts of dimethyl maleic dinitrile as described in Example 1, 3-ethyl-4-methyl-(or 3-methyl-4-ethyl)-2-amino - 5 - imino-pyrrolenine is obtained. The imino ether hydrochloride formed as intermediate is recovered by distilling off the organic solvent in vacuo.

Example 3

By using 132 parts of tetramethylene maleic dinitrile instead of 106 parts of dimethyl maleic dinitrile as in Example 1, 3,4 - tetramethylene - 2 - amino-5-imino-pyrrolenine is obtained.

Instead of the methanolic ammonia of Example 1, a solution can be used which is obtained by passing gaseous ammonia over solid ammonium nitrate. By this procedure the amino-imino-pyrrolenines are obtained as nitrates upon evaporating the ammonia.

Example 4

By using 174 parts of methyl cyclohexyl fumaric or maleic dinitrile instead of the 106 parts of dimethyl maleic dinitrile as in Example 1, 3-cyclohexyl-4-methyl- (or 3-methyl-4-cyclohexyl)-2-amino-5-imino-pyrrolenine is obtained.

Example 5

(a) Into a mixture of 1200 parts of methyl ethyl maleic dinitrile and methyl ethyl fumaric dinitrile (=10 mols), 460 parts of absolute ethanol or 320 parts of absolute methanol (=10 mols), and 3600 parts by volume of absolute benzene or chlorobenzene, hydrogen bromide is introduced for 6 hours with a high speed at about 10° C. After some time colorless crystals are precipitating. Upon standing for another 48 hours, the surplus hydrogen bromide and the organic solvent are evaporated in vacuo at a bath temperature of about 35° C.

The imino ether obtained as residue can either be worked up directly as under (b) or it can be purified by mixing it with 600 parts by volume of ether or gasoline and subsequent filtration. From the filtrate 80–100 parts of a mixture of unchanged dinitrile can be recovered by evaporating the solvent.

(b) The imino ether obtained according to (a) is added at about 0–10° C. in portions to methanolic ammonia which is obtained by introducing 610 parts of gaseous ammonia to 8500 parts by volume of methanol at a temperature of about 0° C. while stirring. Then the reaction mixture is heated for a short time to 40° C. After cooling, the precipitated ammonium bromide is sucked off. The filtrate is evaporated in vacuo and the residue dissolved in 2500 parts by volume of cold water. Upon filtration, 1500 parts of ammonium nitrate are added to the solution. Thereafter, about 2500 parts by volume of nitric acid of the specific weight of 1.5 are dropwise added at about 0° C. while stirring until the mixture is acid to Congo paper. Thereby the nitrate of the methyl ethyl 2-amino-5-imino-pyrrolenine precipitates in slightly yellowish crystals. The precipitate is sucked off, washed with a small amount of concentrated ammonium nitrate solution and dried in the air or in vacuo. Yield 70–80% of the theory.

Instead of the methanolic ammonia, a mixture of alcohol and pulverized ammonium carbonate, containing an equivalent amount of ammonia, may be used for the reaction with the imino ether.

Example 6

146 parts of the crude mixture of phenyl methyl maleic and fumaric dinitrile as obtained from the cyanhydrine of aceto-phenylacetonitrile by splitting of water with phosphorous oxychloride and pyridine, are stirred with 146 parts of absolute benzene and 27,8 parts of methanol. Then, during 6 hours and at a temperature of 0–5° C., hydrogen bromide is introduced, which is obtained by adding dropwise 280 parts of bromine into 150 parts of boiling tetraline. The mixture is stirred for several hours at the same temperature. Thereafter, 35–45 parts of benzene are added to the crystalline paste obtained. The crystals are sucked off, washed with gasoline and dried in vacuo, yielding 324 parts of a bright yellow reaction product. The latter is added to a mixture of 500 grams of benzene and 570 milliliters of 7.5 n-methanolic ammonia while cooling and stirring. After 10 minutes, the surplus ammonia is removed by evacuation. The reaction mixture is cooled to 0° C. and the precipitated ammonium chloride filtered off and washed with a mixture of equal parts of benzene and methanol. From the filtrate the organic solvent is evaporated at low temperature and the residue ground. 160 parts of a greenish-grey powder are obtained which mainly consists of the basic bromide of the amino-imino-phenyl-methyl-pyrrolenine.

We claim:

1. Process for the production of 2-amino-5-imino-pyrrolenine salts, which comprises reacting a member selected from the group consisting of maleic and fumaric dinitriles and mixtures thereof, of the general formula

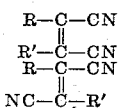

wherein R stands for a member of the group consisting of alkyl, cycloalkyl, aralkyl, phenyl, halogen and H, R' stands for a member of the group consisting of alkyl, cycloalkyl, aralkyl and halogen, and R+R' may be ring members of a cycloalkylene ring in the case of the maleic dinitrile, with alcohol and a member of the group consisting of dry hydrogen chloride and dry hydrogen bromide in an inert organic diluent, treating the imino ether formed with ammonia, and recovering the pyrrolenine salt thus obtained.

2. Process for the production of 2-amino-5-imino-pyrrolenine salts, which comprises reacting at temperatures of —10° to +20° C. a member selected from the group consisting of maleic and fumaric dinitriles and mixtures thereof, of the general formula

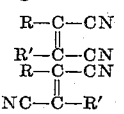

wherein R stands for a member of the group consisting of alkyl, cycloalkyl, aralkyl, phenyl, halogen and H, R' stands for a member of the group consisting of alkyl, cycloalkyl, aralkyl and halogen, and R+R' may be ring members of a cycloalkylene ring in the case of the maleic dinitrile, with a member selected from the group consisting of methanol and ethanol and with a member selected from the group consisting of dry hydrogen chloride and dry hydrogen bromide in an inert organic diluent, treating the imino ether formed at a temperature of 0–10° C. with ammonia in an inert organic diluent, and recovering the pyrrolenine salt thus obtained.

3. Process for the production of 2-amino-5-imino-pyrrolenines which comprises treating the 2-amino-5-imino-pyrrolenine salts with aqueous alkali hydroxide solution and recovering the free pyrrolenine thus obtained.

4. Process as claimed in claim 1, wherein 1 mol of said dinitriles is reacted with 1 mol of alcohol.

5. Process as claimed in claim 2 wherein one mol of said dinitriles is reacted with 1 mol of alcohol.

References Cited in the file of this patent

FOREIGN PATENTS

| | | |
|---|---|---|
| 2,744,913 | France | May 8, 1956 |
| 698,049 | Great Britain | Oct. 7, 1953 |